(12) United States Patent
Lin et al.

(10) Patent No.: US 12,105,349 B2
(45) Date of Patent: Oct. 1, 2024

(54) OPTICAL DRIVING MECHANISM

(71) Applicant: TDK TAIWAN CORP., Taoyuan (TW)

(72) Inventors: Yi-Chieh Lin, Taoyuan (TW);
Shou-Jen Liu, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 581 days.

(21) Appl. No.: 17/381,685

(22) Filed: Jul. 21, 2021

(65) Prior Publication Data
US 2022/0026664 A1    Jan. 27, 2022

Related U.S. Application Data

(60) Provisional application No. 63/056,183, filed on Jul. 24, 2020.

(51) Int. Cl.
| | | |
|---|---|---|
| *G02B 7/09* | (2021.01) | |
| *G02B 7/02* | (2021.01) | |
| *G02B 7/08* | (2021.01) | |
| *G02B 13/00* | (2006.01) | |
| *G02B 27/64* | (2006.01) | |
| *G03B 5/02* | (2021.01) | |

(52) U.S. Cl.
CPC ............... *G02B 7/09* (2013.01); *G02B 7/023* (2013.01); *G02B 7/025* (2013.01); *G02B 7/026* (2013.01); *G02B 7/08* (2013.01); *G02B 13/0065* (2013.01); *G02B 27/646* (2013.01); *G03B 5/02* (2013.01); *G03B 2205/0053* (2013.01)

(58) Field of Classification Search
CPC .......... G02B 7/09; G02B 7/023; G02B 7/025; G02B 7/026; G02B 7/08; G02B 13/0065; G02B 27/646; G03B 5/02; G03B 2205/0053

USPC ........................................................ 359/811
See application file for complete search history.

(56) References Cited

U.S. PATENT DOCUMENTS

| | | | | |
|---|---|---|---|---|
| 7,433,136 | B2* | 10/2008 | Ichikawa | G03B 9/14 |
| | | | | 359/811 |
| 2011/0102667 | A1* | 5/2011 | Chua | H04N 23/57 |
| | | | | 348/374 |
| 2012/0020654 | A1* | 1/2012 | Yanagisawa | H04N 23/55 |
| | | | | 396/55 |
| 2017/0097517 | A1* | 4/2017 | Chen | H02K 41/0356 |
| 2018/0136430 | A1* | 5/2018 | Lin | G02B 7/08 |
| 2020/0057228 | A1* | 2/2020 | Zhang | H04N 23/54 |

FOREIGN PATENT DOCUMENTS

CN            215340495 U        12/2021

OTHER PUBLICATIONS

Office action mailed Jan. 14, 2022 in corresponding CN Application 202121673854.8, 2 pages.

* cited by examiner

*Primary Examiner* — Sharrief I Broome
(74) *Attorney, Agent, or Firm* — MUNCY, GEISSLER, OLDS & LOWE, PC (57) ABSTRACT

An optical driving mechanism is provided, including a holder, a fixed portion, a first elastic element, and a first adhesive element. The holder is configured to connect an optical element, and moves relative to the fixed portion. The holder is movably connected to the fixed portion via the first elastic element, and the first elastic element is connected to the holder or the fixed portion via the first adhesive element.

19 Claims, 6 Drawing Sheets

OPTICAL DRIVING MECHANISM

CROSS REFERENCE TO RELATED APPLICATIONS

This application claims the benefit of U.S. Provisional Application No. 63/056,183, filed Jul. 24, 2020, the entirety of which is incorporated by reference herein.

BACKGROUND OF THE INVENTION

Field of the Invention

The present disclosure relates to an optical driving mechanism, and more particularly to an optical mechanism configured with elastic elements.

Description of the Related Art

With the development of technology, many electronic devices (such as smartphones) nowadays are equipped with a camera and have the ability to record videos. The user can use the camera module installed on the electronic device to operate the electronic device to capture a variety of photos, bringing people a rich visual enjoyment.

Shaking may occur when a user uses an electronic device equipped with a lens module, which in turn makes the image captured by the lens module blurry. However, requirements for image quality are increasing, making it increasingly important for lens modules to have excellent anti-vibration functions. Thus, to design an excellent optical anti-vibration mechanism is an important issue.

The present invention is directed to the problem of the spring constant of the elastic element becoming nonlinear when the optical driving mechanism with an elastic element of a certain thickness has a large driving stroke. The present disclosure provides a solution to this problem.

BRIEF SUMMARY OF THE INVENTION

The present invention provides an optical driving mechanism, including a holder, a fixed portion, a first elastic element, and a plurality of first adhesive elements. The holder carrys an optical element, and the holder can move relative to the fixed portion. The holder is movably connected to the fixed portion via the first elastic element. The first elastic element is connected to the holder or the fixed portion via the first adhesive elements.

According to some embodiments of the present disclosure, the first elastic element is connected to the holder via the plurality of first adhesive elements. The first elastic element further includes a plurality of first strings, a plurality of second strings, and a plurality of adhesive portions. The first strings and the second strings are connected to the first adhesive elements via the adhesive portions. The holder has a plurality of contact surfaces facing the adhesive portions.

According to some embodiments of the present disclosure, the first elastic element further includes a plurality of first fixed ends for the fixed portion, a plurality of first fixed ends for the movable portion, a plurality of first string roots. The plurality of first fixed ends for the fixed portion are fixedly connected to the fixed portion. The plurality of first fixed ends for the movable portion are fixedly connected to the holder. Each of the first string roots is located at the respective junction between one of the first strings and one of the second strings. When viewed along the optical axis, one of the first string roots is connected to one of the first fixed ends for the fixed portions and one of the first fixed ends for the movable portions, and one of the first string roots is also connected to another one of the first fixed ends for the movable portions.

According to some embodiments of the present disclosure, the first elastic element has a plate-like structure perpendicular to the direction of the optical axis, the adhesive portions and the contact surfaces at least partially overlap when viewed along the direction of the optical axis.

According to some embodiments of the present disclosure, the first strings and the second strings have strip structures.

According to some embodiments of the present disclosure, the optical driving mechanism further includes a second elastic element. The second elastic element includes a plurality of second fixed ends for the fixed portion, a plurality of second fixed ends for the movable portion, a plurality of third strings, a plurality of second adhesive elements, and a plurality of second string roots. The plurality of second fixed ends for the fixed portion are fixedly connected to the fixed portion, the plurality of second fixed ends for the movable portion are fixedly connected to the holder. Each of the second fixed ends for the movable portions is movably connected to one of the second fixed ends for the fixed portions via the corresponding third strings. Each of the second string roots is located at a junction between one of the second fixed ends for the movable portions and one of the third strings. The second elastic element is connected to the holder via the second adhesive elements, and each of the second adhesive elements is adjacent to a respective second string root.

According to some embodiments of the present disclosure, a thickness of the first elastic element is less than a thickness of the second elastic element.

According to some embodiments of the present disclosure, the thickness of the first elastic element is 0.03 mm, and the thickness of the second elastic element is 0.04 mm.

According to some embodiments of the present disclosure, the first elastic element and the second elastic element may include titanium copper.

According to some embodiments of the present disclosure, the first adhesive element and the second adhesive element may include UV resin.

According to some embodiments of the present disclosure, the holder can move from an initial position to a first limiting position along the direction of the optical axis by the first elastic element and the second elastic element.

According to some embodiments of the present disclosure, the first elastic element and the second elastic element each have a predeformation when the holder is located in the initial position, and the amount of predeformation of the first elastic element and the second elastic element are different.

According to some embodiments of the present disclosure, the holder is moved from the initial position to a second limiting position along the direction of the optical axis by the first elastic element and the second elastic element.

According to some embodiments of the present disclosure, the second strings do not contact the upper portion of the holder when the holder is located in the second limiting position relative to the fixed portion. The second strings contact the upper portion of the holder when the holder is located in the first limiting position relative to the fixed portion.

According to some embodiments of the present disclosure, there is a critical position between the initial position and the second limiting position. The first string roots contact the upper portion of the holder when the holder is located between the initial position and the critical position. The first string roots do not contact the upper portion of the holder when the holder is located between the critical position and the second limiting position.

According to some embodiments of the present disclosure, the holder has a first displacement in the direction of the optical axis when the holder is located in the first limiting position relative to the fixed portion.

According to some embodiments of the present disclosure, the holder has a second displacement in the direction of the optical axis when the holder is in the second limiting position relative to the fixed portion.

According to some embodiments of the present disclosure, the first displacement is less than the second displacement.

According to some embodiments of the present disclosure, the spring constant of the first elastic element and the second elastic element are substantially constant values when the holder is located in the second limiting position.

BRIEF DESCRIPTION OF THE DRAWINGS

In order to make the above and other objectives, features, and advantages of the present disclosure more obvious and understandable, preferred embodiments are listed below in conjunction with the accompanying drawings, which are described in detail as follows.

DETAILED DESCRIPTION OF THE INVENTION

In order to make the purpose, features, and advantages of the present disclosure more obvious and understandable, the following embodiments are specially cited, and the accompanying drawings are used for detailed description. The exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In addition, relative terms such as "lower" or "bottom" and "upper" or "top" may be used in the embodiments to describe the relative relationship between one element and another element of the illustration. It should be understood that if the illustrated device is turned upside down, the elements described on the "lower" side will become the elements on the "upper" side.

The making and using of the embodiments of the optical driving mechanism are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure. Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted in an idealized or overly formal manner unless defined otherwise.

Figure 1:
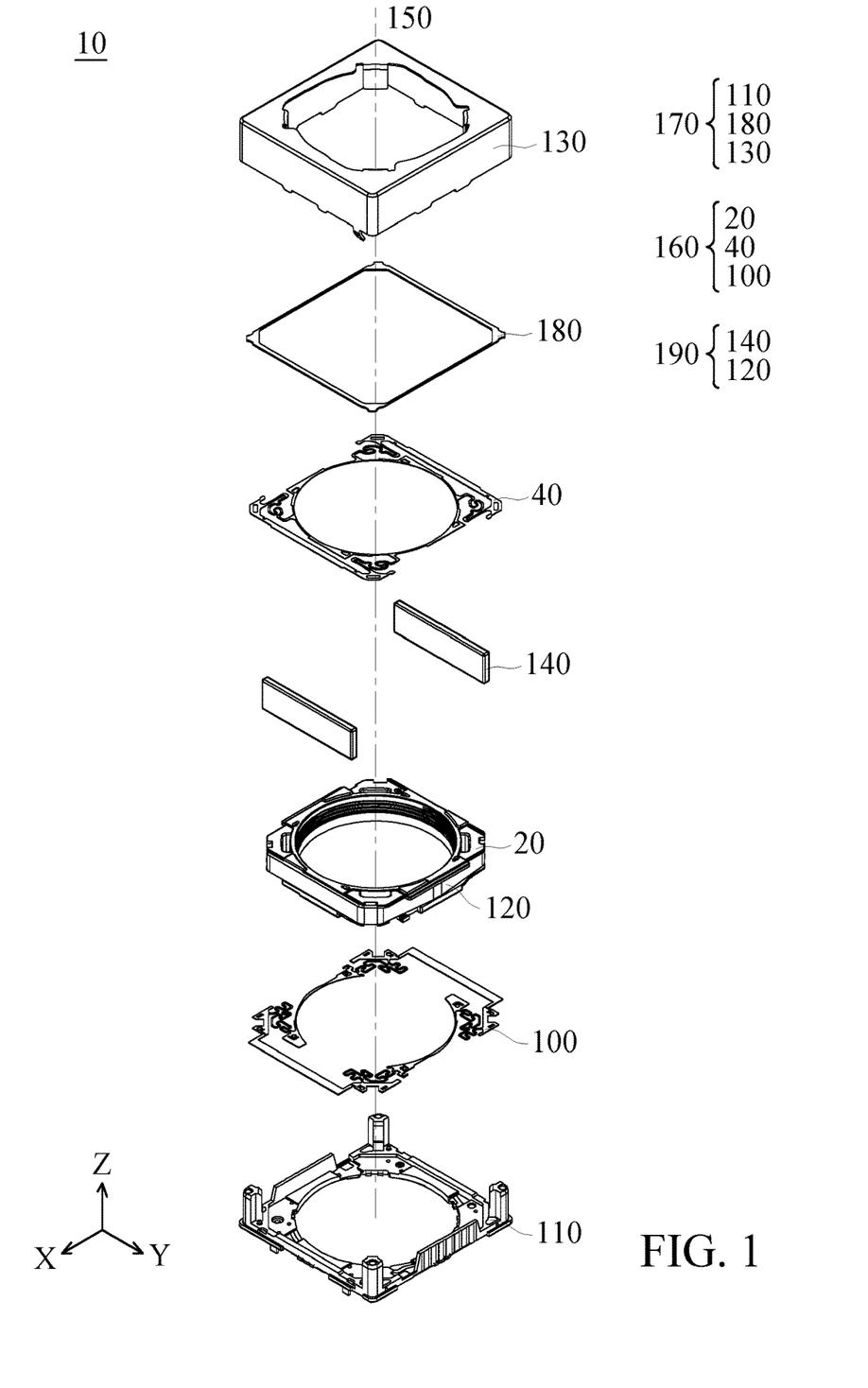
FIG. 1 is an exploded view of an optical driving mechanism according to some embodiments of the disclosure.

Referring to FIG. 1, FIG. 1 is an exploded view of an optical driving mechanism according to some embodiments of the present disclosure. The optical driving mechanism 10 may be disposed in an electronic device such as a camera, a tablet computer, or a mobile phone, and has an accommodating portion or a holder for carrying an optical element (not shown), such as, a device having one or more optical lens of lens. When light from the outside enters the optical driving mechanism 10 that carries the optical element, the incident light passes through the optical element disposed in the optical driving mechanism 10 along the optical axis 150 of the optical element from the light incident end (near a housing 130) to the light emitting end (near a base 110), and reaches a photosensitive element module (not shown) outside the optical drive mechanism 10 to obtain images.

As shown in FIG. 1, the optical driving mechanism 10 is used to drive the optical element, and mainly includes a fixed portion 170, a movable portion 160, and a driving assembly 190. The fixed portion 170 includes a base 110, a spacer 180, and a housing 130. The movable portion 160 includes a holder 20, a first elastic element 40, and a second elastic element 100. The driving assembly 190 includes two magnetic elements 140 and a coil 120. The housing 130 and the base 110 of the fixed portion 170 are combined and fixed with each other to form an accommodating space, so as to provide the components and protect them.

It should be understood that the holder 20 is connected to the spacer 180 and the base 110 via the first elastic element 40 and the second elastic element 100, respectively, so that the holder 20 can be suspended inside the housing 130. The optical element is fixed in the holder 20, and the magnetic elements 140 and the coil 120 may form a driving assembly 190 for driving the holder 20 to move along the direction of the optical axis 150 (i.e. the Z direction) to achieve the function of autofocus. However, the same settings as in the present disclosure may also be applied to achieve the function of optical image stabilization.

The first elastic element 40 and the second elastic element 100 may be upper and lower leaf springs to provide the holder 20 to movably connect the spacer 180 and the base 110. The second elastic element 100 is disposed on the base 110 and connected to the lower portion of the holder 20. The first elastic element 40 is disposed above the holder 20 and connected to the upper portion of the holder 20. The first elastic element 40 is connected to the holder 20 or the fixed portion 170 via the first adhesive element 50 (shown in FIG. 2). In other words, this technique can be used in connection with the movable portion 160 or in the connection with the fixed portion 170.

Figure 2:
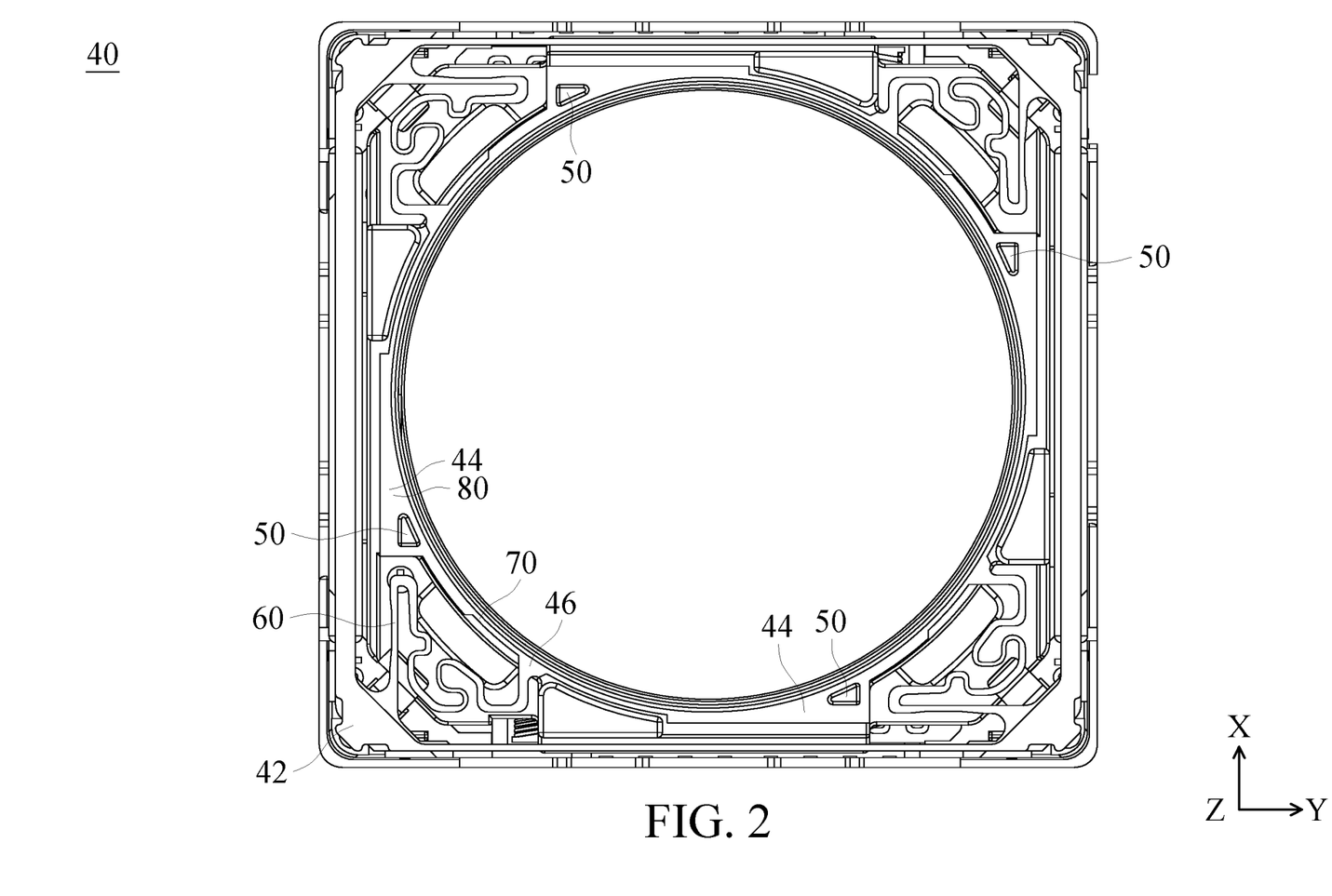
FIG. 2 is a top view of a first elastic element of the optical driving mechanism according to some embodiments of the disclosure.

In some embodiments of the present disclosure, the first adhesive element 50 may be UV resin, but the present invention is not limited thereto. For example, the first adhesive element 50 may also be a protrusion or a positioning hole engaging with a corresponding element (for example, a positioning hole or a protrusion on the holder 20) to connect the first elastic element 40 to the holder 20 or the fixed portion 170.

FIG. 2 is a top view of the optical driving mechanism 10 including the first elastic element 40 according to some embodiments of the present disclosure. As shown in FIG. 2, the first elastic element 40 includes four first strings 60, four second strings 70, four adhesive portions 80, four first fixed ends for the fixed portion 42, four first fixed ends for the movable portion 44, and four first string roots 46. The first fixed ends for the fixed portion 42 may be fixedly connected to the spacer 180 (as shown in FIG. 1) of the fixed portion 170. The first fixed ends for the movable portion 44 may be fixedly connected to the holder 20. The first string root 46 is located at a junction between the first string 60 and the second string 70. In other words, the two ends of the first string 60 are the first fixed ends for the fixed portion 42 and the first string root 46 respectively, and the two ends of the second string 70 are the first fixed ends for the movable portion 44 and the first string root 46 respectively. The first fixed ends for the movable portion 44 is located at the adhesive portions 80.

Specifically, the first string 60 may be regarded as the string arm portion of the first elastic element 40, and the second string 70 may be regarded as the inner loop string portion of the first elastic element 40 that is not the adhesive portion 80. The first string 60 and the second string 70 are connected to the first adhesive element 50 via the adhesive portion 80, and both the first string 60 and the second string 70 have strip structures.

Figure 4:
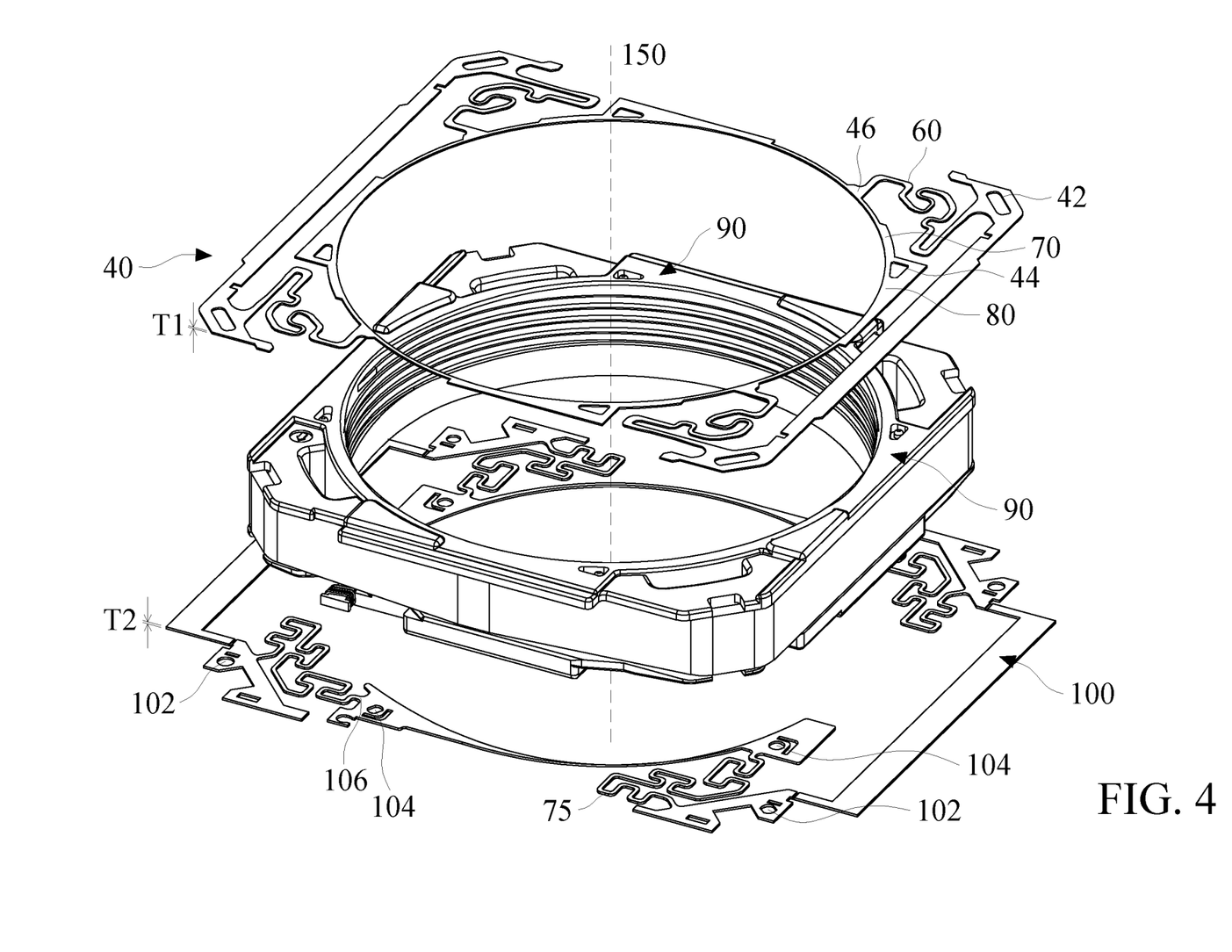
FIG. 4 is a perspective view of the first elastic element, the second elastic element, and a holder according to some embodiments of the present disclosure.

In addition, the holder 20 further includes a contact surface 90 (as shown in FIG. 4), and the adhesive portions 80 of the first elastic element 40 may face the contact surface 90 of the holder 20. The first elastic element 40 may have a plurality of first strings 60, a plurality of second strings 70 and a plurality of adhesive portions 80. In the present embodiment, the first elastic element 40 has four first strings 60, four second strings 70 and four adhesive portions 80, respectively, but the number of the first string 60, the second string 70 and the adhesive portion 80 of the first elastic element 40 may also be different from the present embodiment.

In the present embodiment, the first elastic element 40 has four first fixed ends for the fixed portion 42, four first fixed ends for the movable portion 44, and four first string roots 46, but the number of the first fixed ends for the fixed portion 42, the first fixed ends for the movable portion 44, and the first string root 46 of the first elastic element 40 may also be different from the present embodiment. When viewed along the direction of the optical axis (i.e. the Z direction), a first string root 46 is not only connected to a first fixed ends for the fixed portion 42 and a first fixed ends for the movable portion 44, but also connected to another first fixed ends for the movable portion 44.

Compared with the conventional technique, the first adhesive element 50 is disposed at the first string root 46 (the end of the string), so that the inner loop string portion of the first elastic element 40 cannot be driven when the holder 20 is displaced. As a result, the spring constant of the first elastic element 40 becomes nonlinear when the holder 20 is in a large driving stroke. For example, since the inner loop string portion of the first elastic element 40 cannot be driven when the holder 20 is moved, as the amount of deformation of the first elastic element 40 becomes larger, the spring constant of the first elastic element 40 also becomes larger.

On the contrary, since the first adhesive element 50 in the embodiment is not disposed at the first string root 46 of the first elastic element 40, the second string 70 may be driven together with the first string 60. Especially when the holder 20 is driven by the driving assembly 190 to performs a large driving stroke. The second string may be regard as the inner loop string portion other than the adhesive portions 80. Therefore, even when the first elastic element 40 is close to a limiting position, the spring constant may still be linear.

In other words, the spring constant of the first elastic element 40 of the optical driving mechanism 10 provided in the present disclosure does not become larger as the amount of the deformation of the first elastic element 40 becomes larger. Therefore, the stability and quality of the optical driving mechanism 10 may be improved. In addition, a spring constant of the first elastic element 40 is different from a spring constant of the second elastic element 100.

Figure 3:
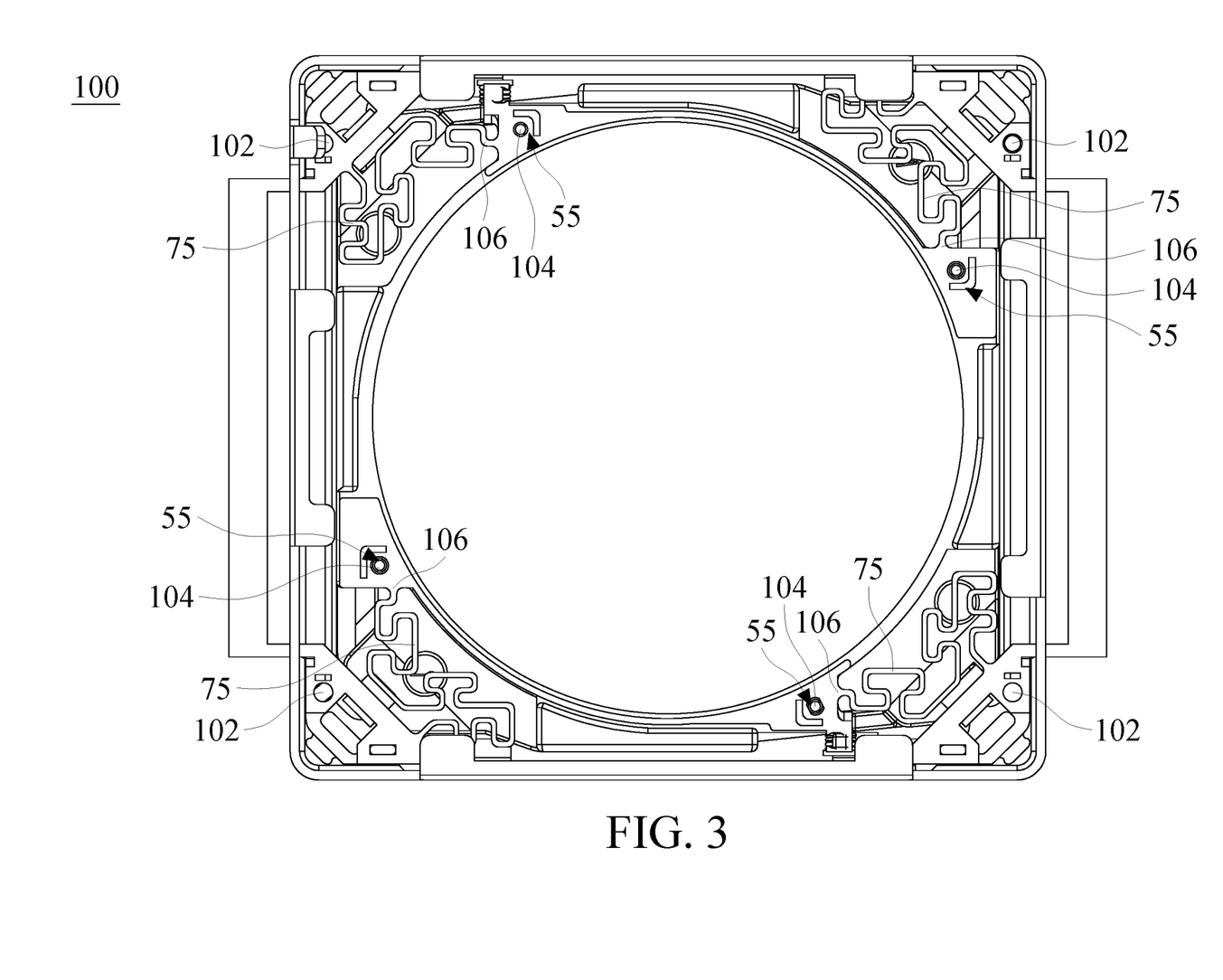
FIG. 3 is a top view of a second elastic element of the optical driving mechanism according to some embodiments of the disclosure.

FIG. 3 illustrates the second elastic element 100 according to some embodiments of the present disclosure. The second elastic element 100 includes four second fixed ends for the fixed portion 102, four second fixed ends for the movable portion 104, four third strings 75, four second adhesive elements 55, and four second string roots 106. The number of the second fixed ends for the fixed portion 102, the second fixed ends for the movable portion 104, the third string 75, the second adhesive element 55, and the second string root 106 of the second elastic element 100 may also be different from the present embodiment. In some embodiments of the present disclosure, the second adhesive element 55 may be UV resin, but the present invention is not limited thereto. For example, the second adhesive element 55 may also be a protrusion or a positioning hole engaging with a corresponding element (for example, a positioning hole or a protrusion on the holder 20) to connect the second elastic element 100 to the holder 20 or the fixed portion 170 (as shown in FIG. 1).

The second fixed ends for the fixed portion 102 may be fixedly connected to the base 110 of the fixed portion 170 (as shown in FIG. 1). The second fixed ends for the movable portion 104 may be fixedly connected to the holder 20. The second fixed ends for the movable portion 104 are movably connected to the second fixed ends for the fixed portion 102 via the third string 75. The second string root 106 is located at a junction between the second fixed ends for the movable portion 104 and the third string 75.

FIG. 4 is a perspective view of the first elastic element 40, the second elastic element 100, and the holder 20 according to some embodiments of the present disclosure. The thickness T1 of the first elastic element 40 is less than the thickness T2 of the second elastic element 100, wherein the thickness of the first elastic element 40 may be 0.03 mm, and the thickness of the second elastic element 100 may be 0.04 mm, but the present disclosure is not limited thereto. The contact surface 90 of the holder 20 can be seen in FIG. 4. The adhesive portion 80 of the first elastic element 40 may be connected to the contact surface 90 by the first adhesive element 50 (as shown in FIG. 2).

Figure 5A:
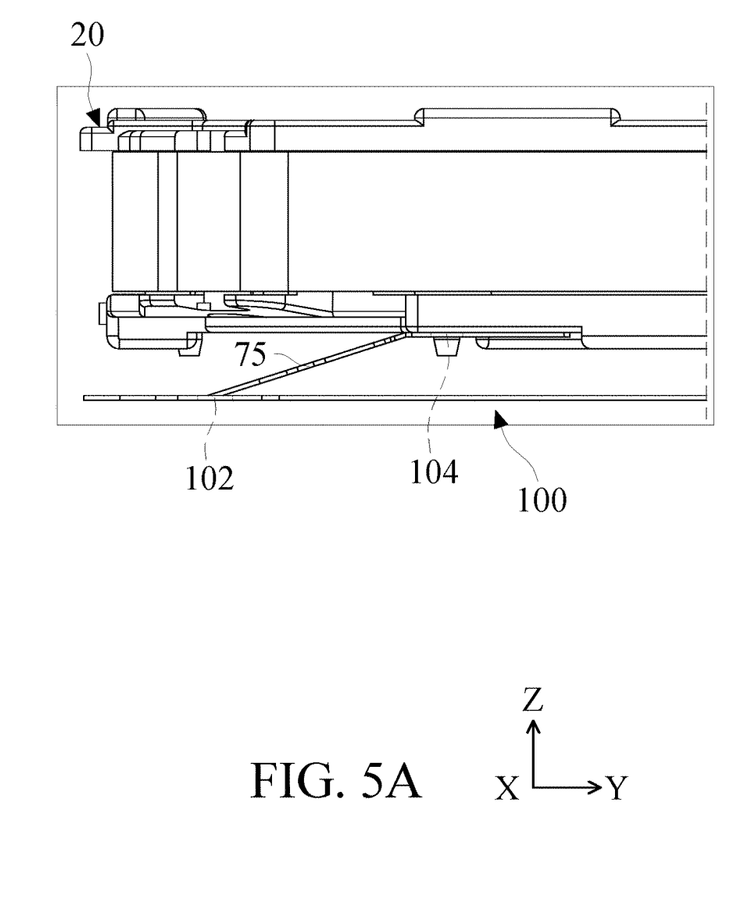
FIG. 5A is an enlarged side view when the first elastic element and the holder in FIG. 4 are in a first limiting position.

FIG. 5A is an enlarged side view when the second elastic element 100 and the holder 20 in FIG. 4 are in a first limiting position. The second fixed ends for the fixed portion 102 of the second elastic element 100 may be fixedly connected to the base 110 of the fixed portion 170 (as shown in FIG. 1), and the second fixed ends for the movable portion 104 may be fixedly connected to the holder 20. As shown in FIG. 5A, the two ends of the third string 75 are the second fixed ends for the fixed portion 102 and the second fixed ends for the movable portion 104, respectively.

Figure 5B:
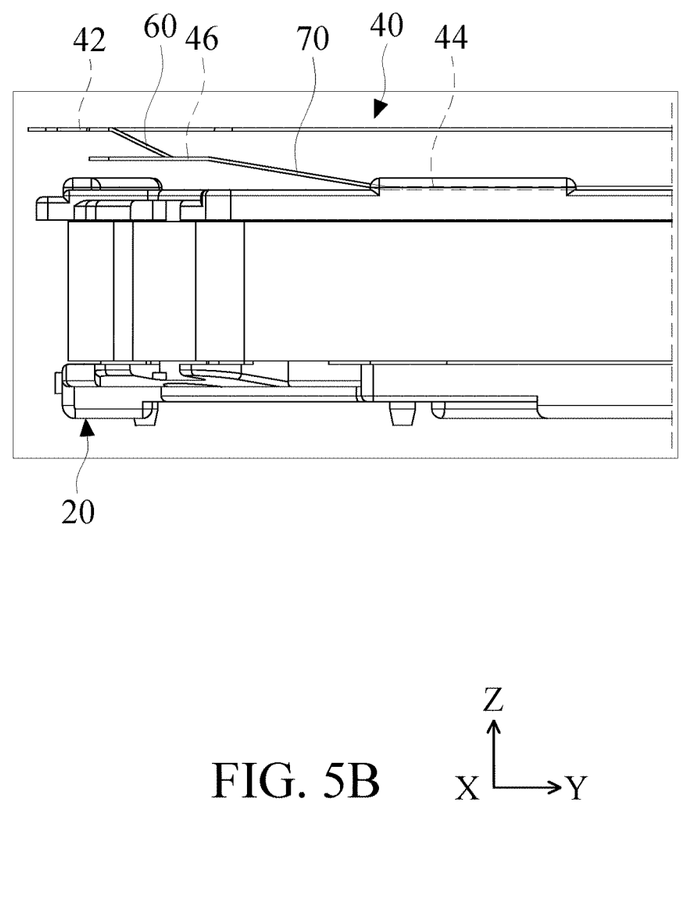
FIG. 5B is an enlarged side view when the second elastic element and the holder in FIG. 4 are in a second limiting position.

FIG. 5B is an enlarged side view when the first elastic element 40 and the holder 20 in FIG. 4 are in a second limiting position. The first fixed ends for the fixed portion 42 of the first elastic element 40 may be fixedly connected to the spacer 180 of the fixed portion 170 (as shown in FIG. 1). The first fixed ends for the movable portion 44 may be fixedly connected to the holder 20. The first string root 46 is located at the junction between the first string 60 and the second string 70.

As shown in FIG. 5B, the two ends of the first string 60 are the first fixed ends for the fixed portion 42 and the first string root 46, respectively. The two ends of the second string 70 are the first string root 46 and the first fixed ends for the movable portion 44, respectively. It should be noted that when in the second limiting position, the first string root 46 of the first elastic element 40 does not contact the upper portion of the holder 20. In addition, when the first elastic element 40 in the optical driving mechanism 10 is in the second limiting position, the spring constant of the first elastic element 40 may be substantially linear.

Figure 6A:
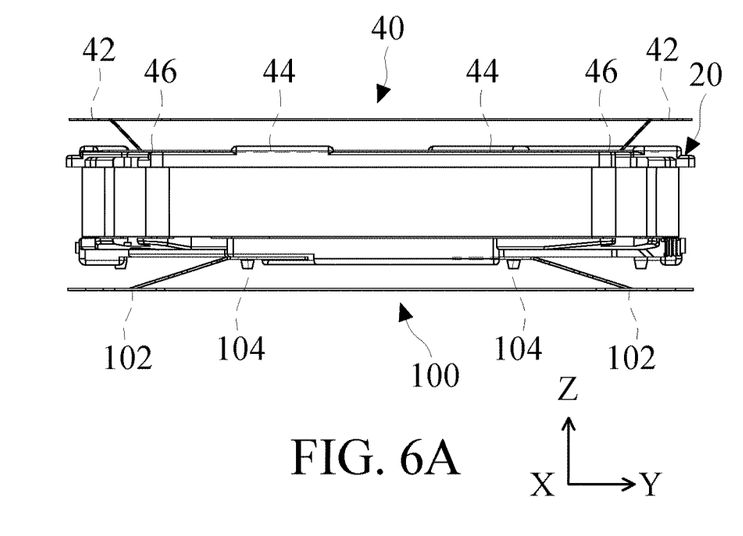
FIG. 6A is a side view when the first elastic element, the second elastic element, and the holder in FIG. 4 are in an initial position.

FIG. 6A is a side view when the first elastic element 40, the second elastic element 100, and the holder 20 in FIG. 4 are in an initial position. It should be understood that the illustrations in the present disclosure are for illustrative purposes only, and may not be drawn to scale. When the first elastic element 40, the second elastic element 100, and the holder 20 of the optical driving mechanism 10 are in the initial position, the first string root 46 may contact the upper portion of the holder 20.

It should be noted that when the first elastic element 40, the second elastic element 100, and the holder 20 of the optical driving mechanism 10 are in the initial position, the first elastic element 40 and the second elastic element 100 may both have a predeformation. In other words, when the holder 20 is in the initial position, the first elastic element 40 and the second elastic element 100 have a deformation in the direction of the optical axis 150. According to some embodiments of the present disclosure, the amount of predeformation of the first elastic element 40 and the second elastic element 100 are different. According to some embodiments of the present disclosure, the amount of predeformation of the first elastic element 40 may be greater than that of the second elastic element 100.

In the initial position, the first elastic element 40 and the second elastic element 100 both have a deformation, so that the magnetic element 140 in the optical driving mechanism 10 may have a greater height in the direction of the optical axis 150. Thus, the driving assembly 190 may generate a greater driving force. According to some embodiments of the present disclosure, the first elastic element 40 and the second elastic element 100 may be made of titanium copper, but the present disclosure is not limited thereto.

Figure 6B:
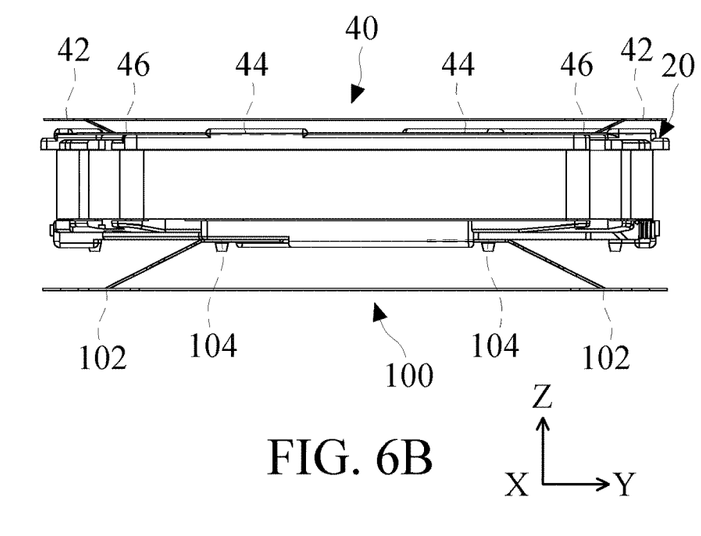
FIG. 6B is a side view when the first elastic element, the second elastic element, and the holder in FIG. 4 are in the first limiting position.

FIG. 6B is a side view showing that the first elastic element 40, the second elastic element 100, and the holder 20 in FIG. 4 are in the first limiting position. The holder 20 in the optical driving mechanism 10 may be moved from the initial position to the first limiting position in the direction of the optical axis 150 by the first elastic element 40 and the second elastic element 100. When the holder 20 is in the first limiting position, the second strings 70 of the first elastic element 40 contact the upper portion of the holder 20. The second string 70 (as shown in FIG. 4 or FIG. 5B) is located between the first string root 46 and the first fixed ends for the movable portion 44.

Figure 6C:
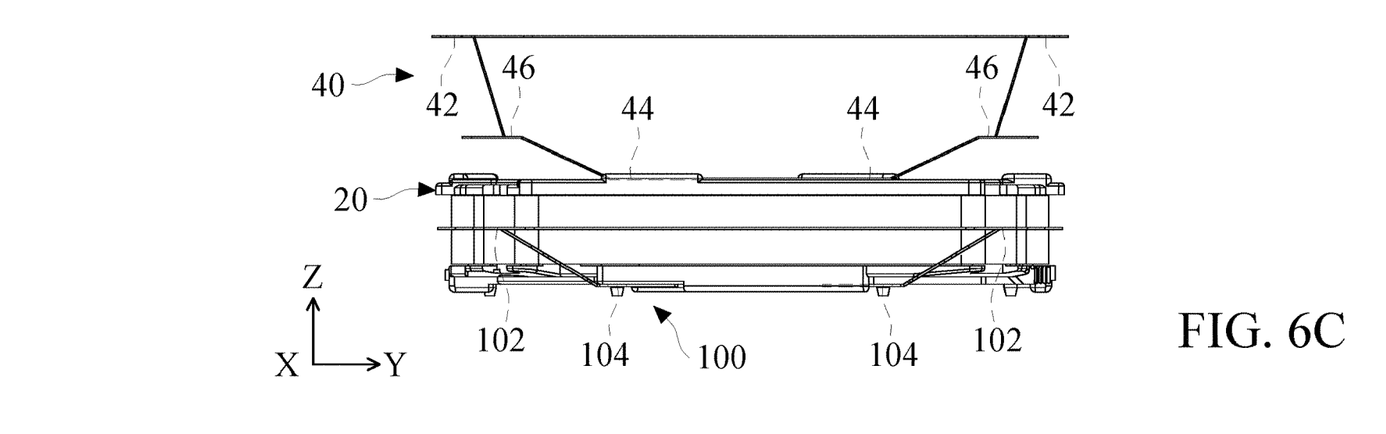
FIG. 6C is a side view when the first elastic element, the second elastic element, and the holder in FIG. 4 are in the second limiting position.

FIG. 6C is a side view showing that the first elastic element 40, the second elastic element 100, and the holder 20 in FIG. 4 are in the second limiting position. When the holder 20 is in the second limiting position, the second strings 70 do not contact the upper portion of the holder 20, wherein the second string 70 (as shown in FIG. 4 or FIG. 5B) is located between the first string root 46 and the first fixed ends for the movable portion 44.

Referring to FIGS. 6A, 6B, and 6C, when the holder 20 moves in the direction of the optical axis (i.e. the Z direction) from the initial position in FIG. 6A to the first limiting position in FIG. 6B, the holder 20 has a first displacement. When the holder 20 moves in the direction of the optical axis 150 from the initial position in FIG. 6A to the second limiting position in FIG. 6C, the holder 20 has a second displacement. The first displacement is less than the second displacement.

Referring to FIGS. 6A and 6C, there is a critical position between the initial position and the second limiting position, and when the holder 20 is located between the initial position and the critical position, the first string roots 46 of the first elastic element 40 may contact the upper portion of the holder 20. On the contrary, when the holder 20 is located between the critical position and the second limiting position, the first string roots 46 of the first elastic element 40 do not contact the upper part of the holder 20.

That is to say, when the holder 20 is located between the critical position and the second limiting position, the string that may deform becomes longer, so that when the holder 20 is in a large driving stroke, the spring constant of the first elastic element 40 may remain linear. In other words, originally the first elastic element 40 in a driving stroke only has the first strings 60 to deform. However, under the configuration of the elastic element and the adhesive element relative to the holder in the embodiment of the present disclosure, the first strings 60 and the second strings 70 of the first elastic element 40 may both deform when the holder exceeds the critical position. Therefore, it can be regarded as the string that may deform becomes longer. This configuration of the present disclosure can make the spring constant of the first elastic element 40 remain linearity in large driving strokes.

In summary, the present invention provides an optical driving mechanism. The optical driving mechanism includes a holder, a fixed portion, a first elastic element, and a first adhesive element. The holder may be used to connect the optical element and may move relative to the fixed portion. The holder is movably connected to the fixed portion via the first elastic element, and the first elastic element is connected to the holder or the fixed portion via the first adhesive element. In this way, the optical element in the movable portion driven by the elastic element may move relative to the fixed portion, thereby achieving functions such as optical focusing or optical shake compensation. Under the configuration of the elastic elements and the first adhesive elements of the present disclosure, the stability of the elastic element of certain thickness in the larger driving stroke may improve, so as to improve the quality of the optical driving mechanism.

Specifically, in the present invention, the first adhesive element in the optical driving mechanism is disposed away from the string root, wherein the first adhesive element is used to movably connect the first elastic element to the holder. In this way, when the driving stroke of the optical driving mechanism is getting closer to a limiting position, the driving assembly may not only drive the string arms, but also drive the inner loop string portion other than the adhesive portion. Therefore, the spring constant of the elastic element, which is originally nonlinear due to the large driving stroke, tends to be linear, so as to improve the quality of the optical driving mechanism.

Use of ordinal terms such as "first", "second", etc., in the claims and specification to modify an element does not by itself connote any priority, precedence, or order of one element over another or the temporal order in which acts of a method are performed, but are used merely as labels to distinguish one element having a certain name from another element having the same name to distinguish the elements.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical driving mechanism, comprising:
    a holder connecting an optical element;
    a fixed portion, wherein the holder moves relative to the fixed portion;
    a first elastic element, wherein the holder is movably connected to the fixed portion via the first elastic element; and
    a plurality of first adhesive elements, wherein the first elastic element is connected to the holder via the first adhesive elements,
    wherein the first elastic element comprises:
    a plurality of first strings;
    a plurality of second strings;
    a plurality of adhesive portions, wherein the first strings and the second strings are connected to the first adhesive elements via the adhesive portions;
    a plurality of first fixed ends for the fixed portion, fixedly connected to the fixed portion;
    a plurality of first fixed ends for the movable portion, fixedly connected to the holder; and
    a plurality of first string roots, wherein each of the first string roots is located at a junction between one of the first strings and one of the second strings respectively,
    wherein when viewed along an optical axis, one of the first string roots is connected to one of the first fixed ends for the fixed portions and one of the first fixed ends for the movable portions, and one of the first string roots is also connected to another one of the first fixed ends for the movable portions.

2. The optical driving mechanism as claimed in claim 1, wherein the holder has a plurality of contact surfaces facing the adhesive portions.

3. The optical driving mechanism as claimed in claim 2, wherein the first elastic element has a plate-like structure perpendicular to a direction of the optical axis, the adhesive portions and the contact surfaces at least partially overlap when viewed along the direction of the optical axis.

4. The optical driving mechanism as claimed in claim 1, wherein the first strings and the second strings have strip structures.

5. The optical driving mechanism as claimed in claim 1, further comprising a second elastic element, wherein the second elastic element comprises:
    a plurality of second fixed ends for the fixed portion, fixedly connected to the fixed portion;
    a plurality of second fixed ends for the movable portion, fixedly connected to the holder;
    a plurality of third strings, wherein each of the second fixed ends for the movable portions is movably connected to one of the second fixed ends for the fixed portions via one of the third strings;
    a plurality of second adhesive elements; and
    a plurality of second string roots, wherein each of the second string roots is located at a junction between one of the second fixed ends for the movable portions and one of the third strings respectively;
    wherein the second elastic element is connected to the holder via the second adhesive elements, and each of the second adhesive elements is adjacent to the second string roots respectively.

6. The optical driving mechanism as claimed in claim 5, wherein the first adhesive element and the second adhesive element comprise UV resin.

7. The optical driving mechanism as claimed in claim 5, wherein the first elastic element and the second elastic element comprise titanium copper.

8. The optical driving mechanism as claimed in claim 5, wherein a thickness of the first elastic element is less than a thickness of the second elastic element.

9. The optical driving mechanism as claimed in claim 8, wherein the thickness of the first elastic element is 0.03 mm.

10. The optical driving mechanism as claimed in claim 8, wherein the thickness of the second elastic element is 0.04 mm.

11. The optical driving mechanism as claimed in claim 5, wherein the holder is moved from an initial position to a first limiting position along a direction of the optical axis by the first elastic element and the second elastic element.

12. The optical driving mechanism as claimed in claim 11, wherein the first elastic element and the second elastic element each have a predeformation when the holder is located in the initial position, and an amount of predeformation of the first elastic element and the second elastic element are different.

13. The optical driving mechanism as claimed in claim 11, wherein the holder is moved from the initial position to a second limiting position along the direction of the optical axis by the first elastic element and the second elastic element.

14. The optical driving mechanism as claimed in claim 13, wherein spring constants of the first elastic element and the second elastic element are substantially constant values when the holder is located in the second limiting position relative to the fixed portion.

15. The optical driving mechanism as claimed in claim 13, wherein the second strings do not contact an upper portion of the holder when the holder is located in the second limiting position relative to the fixed portion, and the second strings contact the upper portion of the holder when the holder is located in the first limiting position relative to the fixed portion.

16. The optical driving mechanism as claimed in claim 13, wherein there is a critical position between the initial position and the second limiting position, the first string roots contact an upper portion of the holder when the holder is located between the initial position and the critical position, and the first string roots do not contact the upper portion of the holder when the holder is located between the critical position and the second limiting position.

17. The optical driving mechanism as claimed in claim 13, wherein the holder has a first displacement in the direction of the optical axis when the holder is located in the first limiting position relative to the fixed portion.

18. The optical driving mechanism as claimed in claim 17, wherein the holder has a second displacement in the direction of the optical axis when the holder is located in the second limiting position relative to the fixed portion.

19. The optical driving mechanism as claimed in claim 18, wherein the first displacement is less than the second displacement.

* * * * *